United States Patent [19]

Müller et al.

[11] Patent Number: 4,599,686

[45] Date of Patent: Jul. 8, 1986

[54] METHOD AND APPARATUS FOR DRIVING A TRANSISTORIZED POLYPHASE PULSE INVERTER

[75] Inventors: Manfred Müller, Nuremberg; Karl Klausecker, Erlangen, both of Fed. Rep. of Germany

[73] Assignee: Siemens Aktiengesellschaft, Berlin & Munich, Fed. Rep. of Germany

[21] Appl. No.: 645,812

[22] Filed: Aug. 30, 1984

[30] Foreign Application Priority Data

Sep. 15, 1983 [DE] Fed. Rep. of Germany ....... 3333408

[51] Int. Cl.[4] .............................................. H02M 1/12
[52] U.S. Cl. ..................... 363/41; 363/132
[58] Field of Search ........................... 363/41, 98, 132

[56] References Cited

U.S. PATENT DOCUMENTS 4,287,556  9/1981  Borland ................................. 363/41
4,364,109 12/1982  Okado et al. ......................... 363/41
4,513,362  4/1985  Aizawa ................................. 363/41

*Primary Examiner*—William H. Beha, Jr.
*Assistant Examiner*—Jeffrey Sterrett

*Attorney, Agent, or Firm*—Kenyon & Kenyon

[57] ABSTRACT

A pulse-inverter, especially a transistor inverter, is required to generate a system of polyphase output voltages as symmetrical as possible, having, for instance, trapezoidal waveforms. For this purpose, several reference voltages having different waveforms are generated wherein each section of an output voltage coincides with a section of a reference voltage. These reference voltages are pulse-width-modulated with a high-frequency sampling frequency and an inverted sampling frequency to form pulse width modulated reference voltages and pulse width modulated inverted reference voltages, respectively. The pulse-width-modulated reference voltages and pulse width modulated inverted reference voltages are coupled to the control lines of the inverter switches so as to generate, section by section, the output voltages having the reference waveform. All reference voltages and components used for generating the driving signal for one inverter output are also used for generating the driving signals of the other outputs so that a symmetrical system of driving voltages is produced without costly adjustments.

7 Claims, 3 Drawing Figures

METHOD AND APPARATUS FOR DRIVING A TRANSISTORIZED POLYPHASE PULSE INVERTER

BACKGROUND OF THE INVENTION

The present invention relates to a method and apparatus for driving the switches of a pulse inverter, and more particularly, for forming pulse-width-modulated driving voltages for driving the switches of a pulse inverter having a plurality of outputs, and, in particular, a transistor inverter.

In a pulse inverter, each output is connected alternatingly via a pair of switches to the two poles of a d-c input voltage, where the ratio of the respective switching times determines an average value for the output voltage at the inverter output.

A reference waveform of predetermined shape can thereby be obtained as the respective output voltage by controlling the closed times of the one switch or the open times of the other switch in accordance with the pulse durations of a pulsating switch control voltage, i.e. a reference voltage which is pulse-width-modulated by a high-frequency clock frequency and is proportional to the desired output waveform.

Generally, a symmetrical system of output voltages is required for driving the different outputs of the inverter. In particular, differing waveshapes between outputs or d-c components are to be avoided. It is customary to form the switching pulses for the respective switches coupled to the inverter outputs by pulse-width modulation of a separate reference voltage associated with each switch. Thus a system of reference voltages, wherein the reference voltages are as strictly symmetrical as possible, is required, i.e., the reference voltages must be distributed equidistantly in accordance with the number of phases of the inverter, and have the same waveshape.

If, for instance, thyristor switches are used as the inverter switches, certain protection times must be observed between the closing of the one and the opening of the other switch. This limits the magnitude of the sampling frequency, and the derivation of the switching commands to the switches from the driving voltages formed by pulse width modulation requires additional measures. This is eliminated if switching transistors are used as inverter switches, which can be switched at high clock frequencies (for instance, 1 to 6 kHz). With switching frequencies of such magnitude, however, the symmetry of the driving voltages must be maintained particularly strictly because small asymmetries can lead to large d-c components. Therefore, unequally fast transitions between the "1" state and the "0" state of the comparators used for the pulse width modulation of the reference voltages and other component tolerances must be carefully matched to each other, which necessitates, as a rule, time-consuming adjustment of, e.g., 6 or more trimmers.

For the loads supplied by the inverter, sinusoidal currents are usually desired. It is known that these sinusoidal currents can frequently be generated, for instance, in the case of 3-phase inverters, with particularly good utilization of the inverter, if output voltages with trapezoidal waveform are generated. In this case, pulse width-modulated symmetrical trapezoidal voltages must therefore be generated as the driving voltages for the inverter switches.

SUMMARY OF THE INVENTION

It is an object of the present invention to provide a method and apparatus for generating pulse-width-modulated driving voltages for a pulse inverter, and especially a transistor inverter having trapezoidal output voltages, wherein the driving voltages are as symmetrical as possible.

While the invention will be explained with reference to a preferred embodiment, e.g. a 3 phase transistor pulse inverter having trapezoidal output voltages, it is also applicable, however, in other cases, for instance, in other polyphase inverters and in inverters having other output voltage waveshapes.

According to the invention, a plurality of periodic reference voltages, which are preselected for generating the symmetrical system of output voltages of the inverter, for example, output voltages having a trapezoidal reference waveform, are pulse-width-modulated with a high-frequency sampling frequency and connected as driving voltages to the control lines of the inverter switches. The driving voltages of the switches coupled to particular inverter outputs are not generated for each switch by separate trapezoidal reference voltages associated with each switch, but rather, the same reference voltages are used for driving all switches. Furthermore, the waveshapes of the various reference voltages are different from each other and the number of the reference voltages is not directly determined by the number of inverter outputs (inverter phases). The number and waveform of the reference voltages rather depends on other criteria which follow from the desired waveform chosen for the output voltage, e.g., a trapezoidal waveform.

Thus, the positive half-wave of a trapezoidal reference waveform, for instance, can be divided into three sections (a rising portion, a plateau, and a falling portion). As reference voltages, a rising ramp function, a constant voltage and a falling ramp function are generated, so that each section of the reference waveform coincides with a section of one of these reference voltages. For the negative half-wave, the respective inverted reference voltages can be used. By suitable choice of the period of the reference voltages, it can be achieved that for each section of the output or reference waveform, sections with the same phase also occur in every reference waveform for the other output voltages (i.e., sections with the same phase spacing from the respective reference curve 0-crossing) which are always coincident with the same reference voltage.

All reference voltages are pulse-width-modulated with the same sampling frequencies and the pulse-width-modulated voltages are assembled section by section to form the desired driving voltages in such a manner that binary control signals for producing the desired trapezoidal waveform are generated.

To this end, the pulse-width-modulated reference voltage (or inverse reference voltage), which is respectively coincident with the desired waveform in the phase section associated with the reference waveform in the actual phase position, is switched to the control line of the switch coupled to the respective inverter output. According to the phase difference between the equidistantly phase-shifted (i.e., "symmetrical") output or reference waveforms, the pulse-width-modulated reference voltages are coupled to the different switch drive lines at different times, and the asymmetries due to component tolerances are the same in all phases since all driving signals are formed using the same components and from the same reference voltages. D-C components in the output voltages or in the machine currents can then no longer occur. Adjustment of the components is no longer required even in the case of extreme asymmetries.

In this connection, it is advantageous if the amplitude of all reference voltages is determined by a common amplitude control variable, and the frequency of all reference voltages, as far as the frequency can be varied at all, is preset by a common frequency control variable. Furthermore, the reference voltages are advantageously chosen so that the corners of the coincident sections of the output voltages are determined by the intersection points of the reference voltages with each other.

Preferably, the intersection points of the reference voltages with a high-frequency sampling voltage (especially in sawtooth or triangle from), are used for generating the pulse-width-modulated reference voltages, and, for generating the pulse-width-modulated inverse reference voltages, the intersections of the respective reference voltages with the inverted sampling voltage are used. In one section of the first half-period, the pulses generated by pulse-width-modulation with the noninverted sampling voltage can then be used for driving the switches, while in the corresponding section of the other half-period, the pulses which are generated by inversion and pulse-width-modulation with the inverted sampling voltage are coupled through to the switch control lines.

BRIEF DESCRIPTION OF THE DRAWINGS

The present invention will be explained in greater detail in the following detailed description with reference to the drawings, in which.

DETAILED DESCRIPTION

Figure 1:
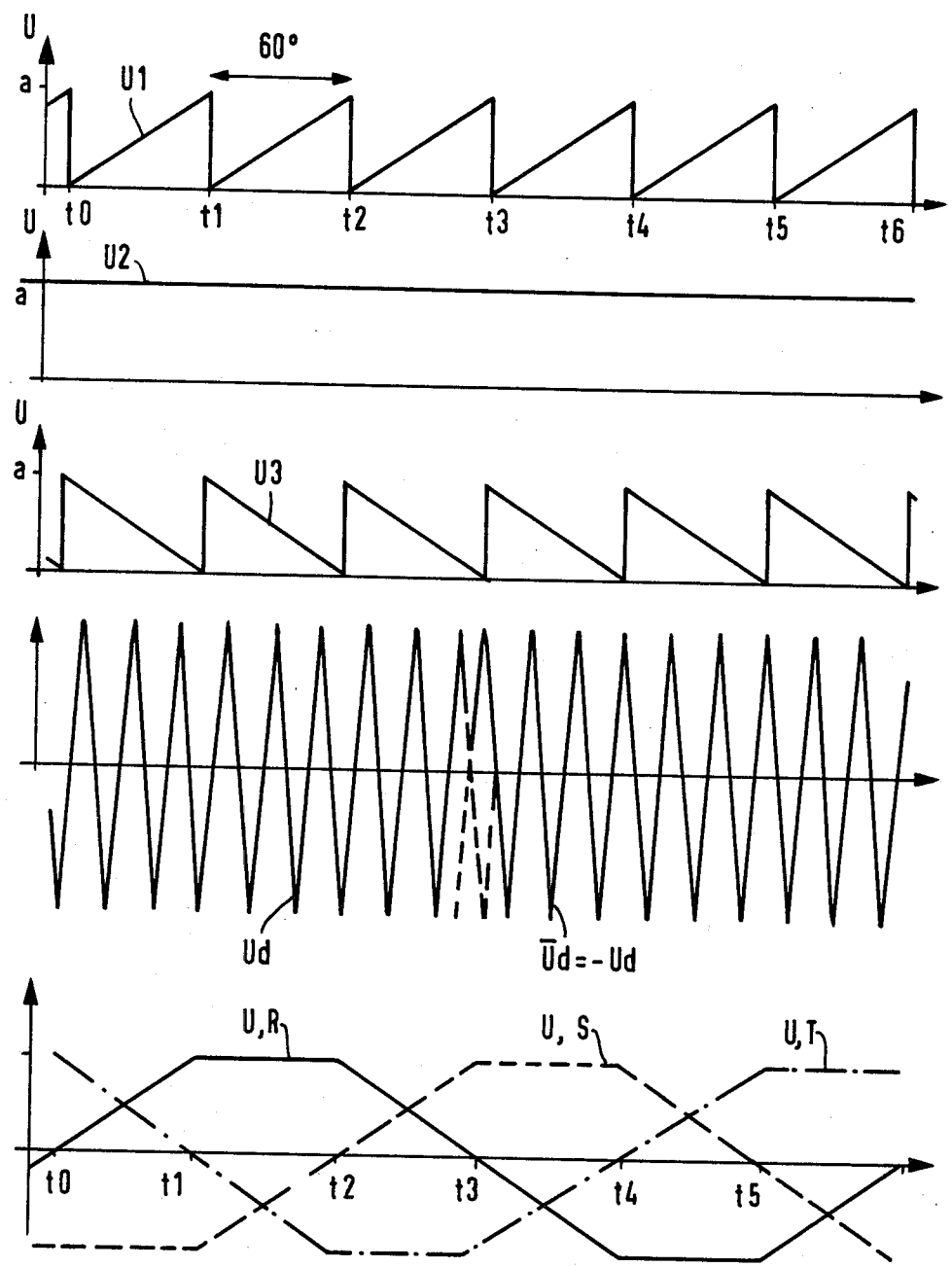
FIG. 1 illustrates the waveforms of three exemplary reference voltages, the sampling voltage and the output voltages (or reference waveforms)

With reference now to the drawings, the lowest portion of FIG. 1 shows the desired curves of the trapezoidal output voltages U,R; U,S; and U,T at the outputs R, S and T of the three-phase pulse inverter 1 illustrated in FIG. 2. Each of these outputs is connected, via a respective switch 2,R 2,S and 2,T, to one pole, and via a corresponding switch 3,R 3,S and 3,T, to the other pole of a d-c voltage source C.D. The switches coupled to the outputs R, S and T are actuated via respective binary driving signals Z,R; Z,S; and Z,T. Switch 2,R is closed during the pulse Z, R=1, and the switch 3,R is closed by a pulse Z,R=1. The same applies to the switches 2,S; 3,S and 2,T; 3,T coupled to the outputs S and T respectively, which are actuated by the driving signals Z,S and Z,T. For generating the output voltages U,R; U,S; and U,T, respectively, the corresponding driving signals must be generated as pulse-width-modulated voltages, wherein the unmodulated waveshape of these voltages is given by the shape of the reference output waveforms, U,R, U,S and U,T.

For generating these driving voltages, a reference voltage generator 4 is provided which is controlled by an amplitude control variable Ua and a frequency control variable Uph and which generates several reference voltages $U_1$, $U_2$ and $U_3$ chosen in accordance with the requirements of the trapezoidal shape of the output voltages. A sampling voltage generator 5 further generates a high-frequency sampling voltage, for instance, of from 1 to 6 kHz.

The reference voltages U1, U2 and U3 formed by the reference voltage generator 4 are modulated in a pulse-width-modulator 6 with the sampling voltage and the pulses generated thereby are fed by a distributor circuit 7 as driving voltages over the control lines of the corresponding switch groups.

The reference voltages generated by the reference voltage generator 4 are common to all driving voltages. Their number and their waveshape are chosen so that in a half-period of the output voltage U,R the sections of the output voltage coincide, section by section, with the respective like sections of the reference voltages for all practical purposes (i.e., except for the amplitude factor). Thus, the reference curve for U,R in the time interval t0 to t1, i.e., in the phase range 0° to 60°, coincides with the ramp function U1 according to FIG. 1 which is generated as the first reference voltage, and the amplitude a of which is given by the amplitude control variable $U_a$. The period of this ramp function is given by 6-times the inverter frequency.

As the second reference voltage U2, a constant voltage having the value of the ramp amplitude a is generated. This voltage U2 is coincident with the next section of the half-wave of the output voltage U,R (time interval t1 to t2 or the phase section 60° to 120°).

As the third reference voltage U3, the difference a−U1 of the constant voltage and the ramp function U1 is generated. This reference voltage U3 is coincident with U,R in the next section of the half period (time interval t2 to t3 or the phase range 120° to 180°).

With this choice of the number and the waveshapes of the reference voltages, it is assured that the first half-period of the output voltage U,S in its first time interval (t2 to t3, phase position 0° to 60°) coincides with a corresponding section of the corresponding reference voltage U1. The same applies to the further phase sections 60° to 120° and 120° to 180° and the corresponding reference voltages U2 and U3. In the same sense, the respective sections of the output voltage U,T with the same phase are each coincident with the respective reference voltages section by section.

These reference voltages are generated by the generator 4 by feeding the frequency control voltage to a voltage to frequency converter 8, the output pulses of which are counted by a counter 9 which may be reset with a signal of 6-times the inverter frequency. The output of the counter therefore represents a digitized sawtooth voltage which is converted by a multiplying digital/analog converter 10, controlled by the amplitude control voltage Ua, or the ramp function amplitude reference value a, into a reference voltage U1. The reference voltages U1 and U2 can therefore be taken at the control input and output of the multiplying D/A converter 10, while the reference voltage U3=a−U1 is formed by a subtraction stage 11.

The sampling voltage generator 5 generates a sampling voltage Ud of constant high frequency and constant amplitude. The sampling voltage generator 5 may be designed as a sawtooth generator, or in particular, as a triangle generator. In the preferred embodiment shown in FIG. 1, it is further provided that, by means of an inverter 12, the inverted sampling voltage $\overline{Ud} = -Ud$ is generated.

The pulse-width-modulator 6 forms the modulated reference voltages and the modulated inverted reference voltages. According to FIG. 2, six comparators, each comprising, for example, subtraction stages 14,1 to 14,6 and clippers 13,1 to 13,6, are provided, where the respective reference voltages and the sampling voltage are impressed on the three first comparators 14,1 and 13,1 to 14,3 and 13,3, while the reference voltages U1, U2, U3 together with the inverted sampling voltage are impressed on the other comparators 14,4 and 13,4 to 14,6 and 13,6 for forming the pulse-width-modulated inverse reference voltages. According to FIG. 2, each of the comparators are of the same type, i.e., the comparators generate a pulse, for instance, if the difference of their input voltages is positive. For forming the pulse-width-modulated inverted reference voltages, inverters 12,4 to 12,6 follow the comparators 13,4 to 13,6.

Figure 3:
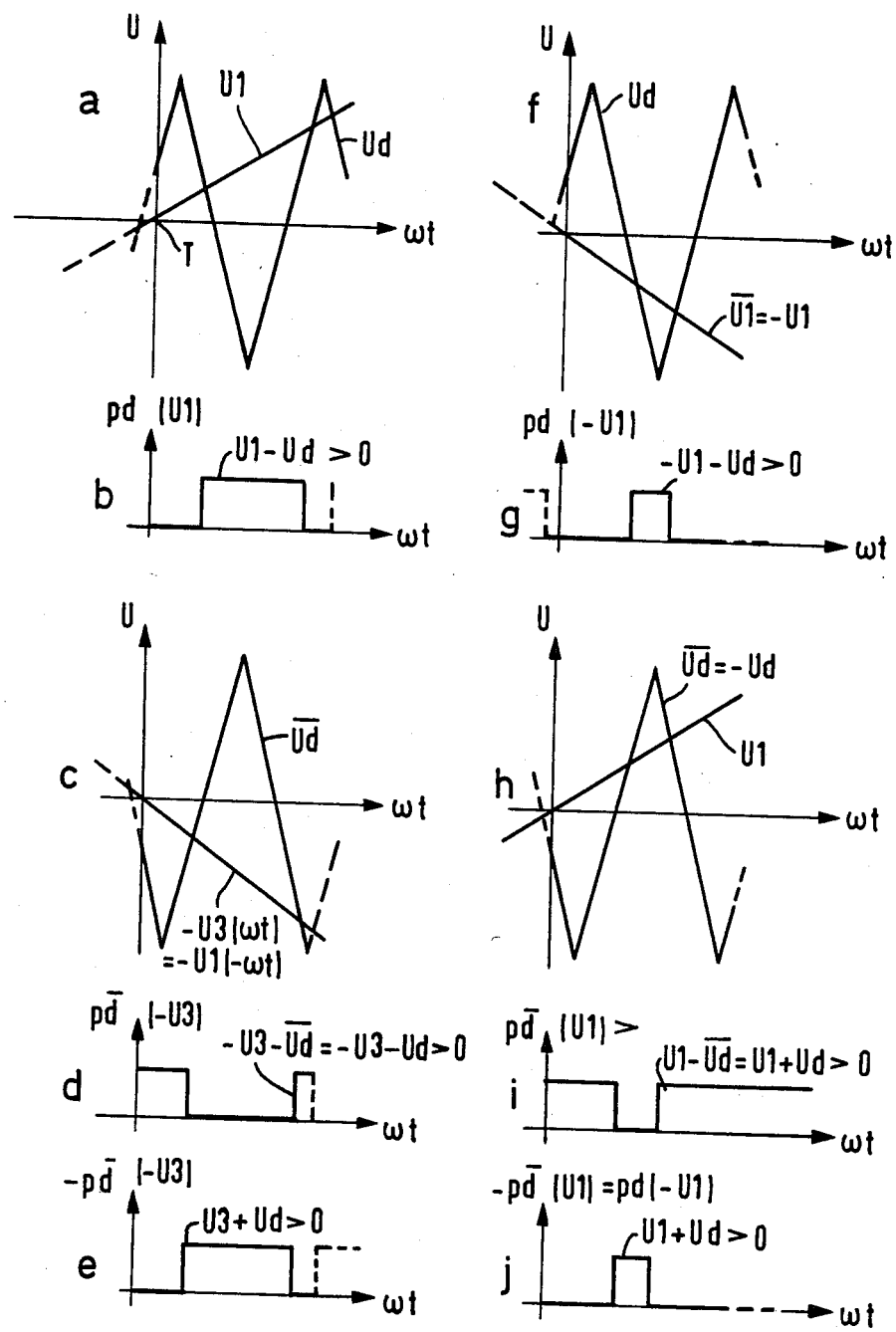
FIG. 3 illustrates, for conceptual purposes, the formation of the pulse-width-modulated inverted reference voltages.

In forming the pulse-width-modulated inverted reference voltages it should be noted that, through the inversion of a pulse-width-modulated voltage, a function is generated which is somewhat different from the function which is generated by the pulse-width-modulation of the inverted voltage. This is shown illustratively in FIG. 3, wherein, in the upper left diagram identified as FIG. 3a, the sampling voltage Ud is fed to a comparator without change but in the upper right diagram identified as FIG. 3f, a transition from U1 to $\overline{U1} = -U1$ is made by inversion of the reference voltage. It is found in the process that the binary signal pd (U1) which is generated by a pulse-width-modulation of the voltage U1 with the sampling voltage Ud, has a pulse which is different, not only with respect to phase position but also to its width, from the phase position and width of the pulses of the function pd (−U1) which is generated by phase modulation of the inverted reference voltage $\overline{U1} = -U1$ with the sampling voltage Ud (FIG. 3g). This pulse-width-modulated inverted reference voltage pd (−U1) can be formed in various ways by inverters at the input and/or output of the corresponding comparator, as a comparison of the diagrams shown in FIGS. 3f–j, one below the other, demonstrates, but it is found, in contrast to the left-hand diagrams of FIGS. 3a–e, that the input voltages U1 and Ud of the comparator are valued always with the same sign. The question therefore arises as to the manner in which inverted reference waveforms required for the driving voltages are pulse-width-modulated in the phase ranges 180° to 240° and 300° to 360°, respectively, of the desired output waveforms. If it is assumed that the driving voltages are to be symmetrical about the reference waveform zero-crossings, the following should apply for the pulse-width-modulated reference waveform U, R: U,R (T+wt)=−U, R (T−wt). It follows because U1 (T−wt)=U3 (T+wt) that the inverted reference voltage U3 must be modulated with the inverse sampling voltage $\overline{Ud}$, as is shown by a comparison of the left-hand diagrams in FIG. 3.

In the preferred embodiment, the pulse-width-modulated reference voltages are therefore generated in accordance with the intersections of the reference voltages with the sampling voltage itself, but the pulse-width-modulated inverted reference voltages are generated in accordance with intersections of the reference voltages with the inverted sampling voltage. Accordingly, the pulse-width-modulator 6 contains six different comparators (comprising clippers 13,1 to 13,6 and subtraction stages 14,1 to 14,6). Three comparators have the sampling voltage at an input while the other three comparators have the inverted sampling voltage at an input. For forming the pulse-width-modulated reference voltages, the first reference voltage (ramp voltage U1) or the second reference voltage (constant voltage U2) or the third reference voltage (difference U3=U2−U1), is impressed on the other input of the first subtraction stage 14,1 or the second subtraction stage 14,2 or the third subtraction stage 14,3, respectively. For forming the pulse-width-modulated inverted reference voltages, the other comparators are preceded or followed by inverting stages (which may be subtraction stages 14,4 to 14,6 and inverters 12,4 to 12,6 as shown) and the first reference voltage (ramp voltage U1), the second reference voltage (constant voltage U2) and the third reference voltage (difference U3=U2−U1) are impressed on the other input of the fourth subtraction stage 14,4, the fifth subtraction stage 14,5 and the sixth subtraction stage 14,6, respectively.

Figure 2:
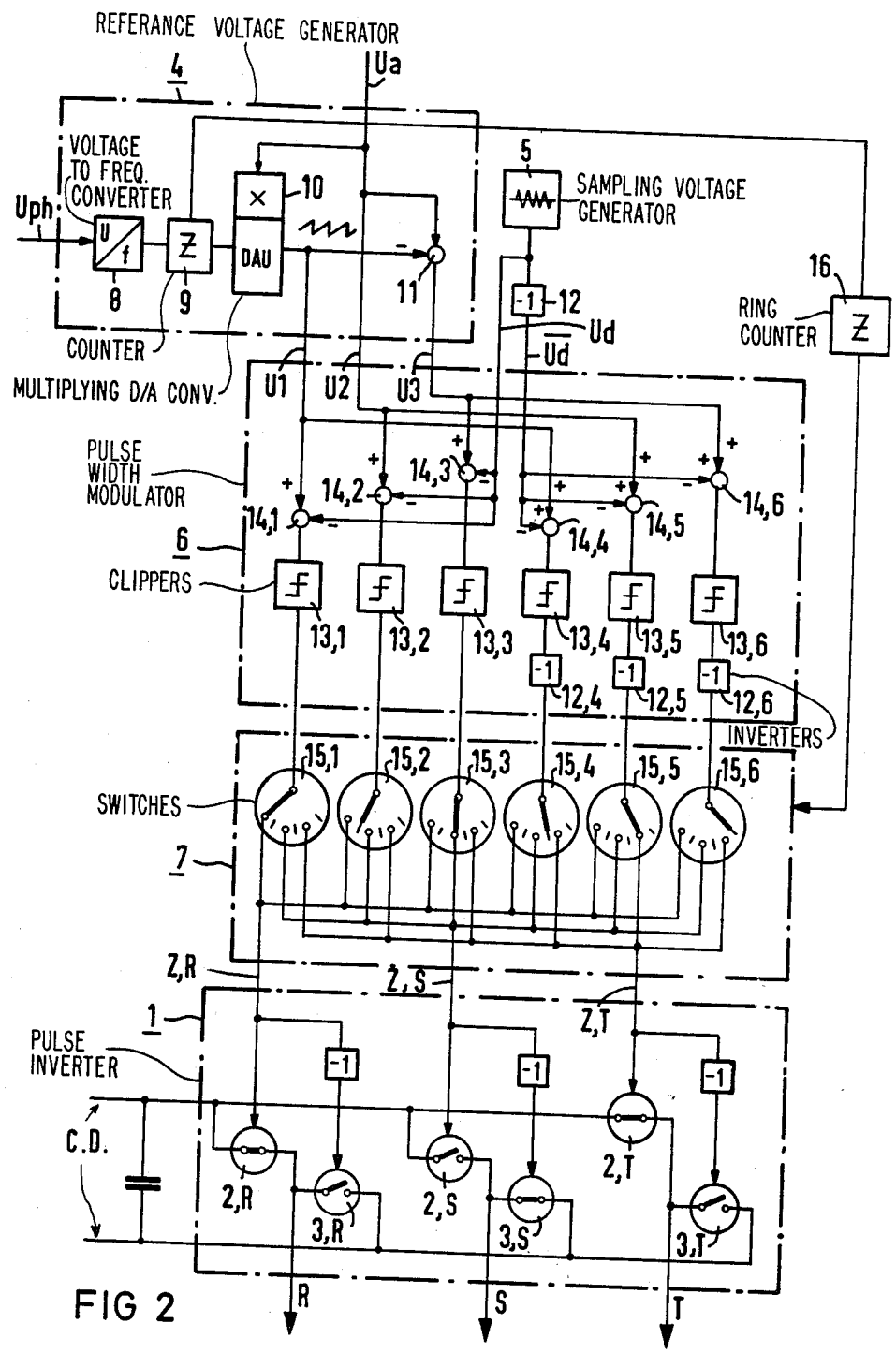
FIG. 2 is a block diagram of apparatus according to the invention.

The pulse sequences made available by the modulator 6 are then distributed by the distributor circuit 7 as the corresponding driving signals Z,R; Z,S; and Z,T, respectively, over the addressing lines of the switches, each coupled to outputs R, S and T, respectively, in such a manner than the pulse sequences, of which the basic reference voltages coincide in the respective sections with the desired output waveform, are coupled through to the addressing lines associated with the respective outputs. From the zero-crossing point of a reference voltage onward, the pulse-width-modulated first, second and third reference voltages and pulse-width-modulated first, second and third inverted reference voltages, are therefore coupled through for the duration of a ramp function period to the control line of the switches associated with the particular reference voltage. For this purpose, six switches 15,1 to 15,6 are shown in FIG. 2, which can connect any reference voltage to any switch as a driving voltage. The switch positions shown correspond to the switching state in the phase range 0° to 60° of the reference waveform for U,R, in which the pulse-width-modulated first reference voltage is connected to the control line Z,R; the pulse width-modulated third reference voltage to the control line for Z,S; and the pulse-width-modulated inverted reference voltage U2 to the control line Z,T. The switches 15,2; 15,4; and 15,6, respectively, block the output signals of the corresponding comparators at the instant in time shown. The double-throw switches may be realized by electronic switches, for instance by a multiplexer, where the selection signal (switch control signal) of the switches is generated, for instance, by a ring counter 16 which counts the periods of the ramp function. With each new period of the ramp function, each double-throw switch is cyclically advanced by one step of its six switch positions.

This circuit assures that a symmetrical system of driving voltages or output voltages of the pulsed inverter is generated even with a high switching frequency and with a minimum effort for adjustment work.

In the foreging specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A method for forming pulse-width-modulated driving voltages for controlling a plurality of switches in a pulse inverter, particularly in a transistor inverter, having a plurality of outputs in order to create a symmetrical system of output voltages at the inverter outputs, each output voltage being proportional to a reference waveform of predetermined shape,
wherein reference voltages are generated, pulse-width modulated with a sampling voltage having a frequency higher than the frequency of the reference voltages, and coupled to a plurality of control lines for driving the switches,
the method comprising:
generating differently shaped reference voltages, whereby the quantity and each shape of said reference voltages are predetermined so that for each of said output voltages having said reference waveform, segments of said output voltages having the same phase distance from corresponding zero-crossing points of said output voltages coincide with respective segments of ones of said reference voltages;
pulse width modulating said reference voltages with at least one of said sampling voltage and an inverted sampling voltage to form, respectively, pulse width modulated reference voltages and pulse width modulated inverted reference voltages, said output voltages having segments associated with respective segments of said pulse width modulated reference voltages and said pulse width modulated inverted reference voltages;
coupling said pulse width modulated reference voltages and said pulse width modulated inverted reference voltages to respective control lines of said switches as said driving voltages for selectively controlling said switches, said pulse width modulated reference voltages and pulse width modulated inverted reference voltages being coupled to said switches segment by segment, each segment being associated with a respective one of said reference voltages.

2. The method recited in claim 1 wherein said step of generating each of said reference voltages comprises generating references voltages having the same amplitude predetermined by an amplitude control variable and, unless said reference voltage is constant, having the same frequency predetermined by a frequency control variable.

3. The method recited in claim 1 further comprising the step of selecting said reference voltages so that corner points of segments of said output voltages coincide with intersections of said reference voltages with each other.

4. The method recited in claim 1, wherein each pulse-width-modulated reference voltage is generated by intersections of a reference voltage with the sampling voltage and each pulse-width-modulated inverted reference voltage is generated by intersections of a reference voltage with the inverted sampling voltage.

5. The method recited in claim 1 wherein said driving voltages are coupled to a three-phase pulse inverter, and wherein
said step of generating reference voltages comprises generating three-reference voltages, the first reference voltage comprising a ramp function having a ramp amplitude determined by an amplitude control variable and a frequency which is six-times the frequency of the output voltages, the second reference voltage comprising a constant voltage equal to the ramp amplitude and the third reference voltage comprising a difference between said two first reference voltages; and
said step of pulse width modulating comprises generating pulse-width-modulated first, second and third reference voltages according to intersections of said respective first, second and third reference voltages with the sampling voltage and generating pulse width modulated inverted first, second and third reference voltages according to intersections of the respective first, second and third reference voltages with the inverted sampling voltage;
said pulse-width-modulated first, second and third reference voltages and said pulse-width-modulated inverted first, second and third reference voltages being coupled to respective control lines of said switches, each of said switches being selectively associated with one of said reference voltages, for the duration of a ramp function period beginning with a zero crossing of said reference voltage associated with said switch.

6. Apparatus for forming pulse-width-modulated driving voltages for controlling a plurality of switches of a pulse inverter having a plurality of outputs and particularly a transistor inverter, comprising:
reference voltage generator means for generating a plurality of reference voltages selected in accordance with a symmetrical system of reference waveforms, said reference waveforms having a predetermined waveshape corresponding to the output voltages at the inverter outputs;
sampling voltage generator means for generating a sampling voltage having a frequency higher than a frequency of said reference waveform;
pulse-width-modulator means coupled to the reference voltage generator means for generating pulse-width-modulated reference voltages and pulse width modulated inverted reference voltages;
distributor circuit means having the pulse width modulated reference voltages and the pulse width modulated inverted reference voltages coupled to respective inputs of the distributor circuit means and having outputs coupled to control lines of the switches of the pulse inverter;
said reference voltage generator means generating a plurality of reference voltages such that the reference voltages have respectively different waveforms, said reference voltages having segments coinciding with segments of said reference waveform having the same phase spacing from respective zero-crossing points of said reference waveforms, each reference waveform segment associated with a corresponding segment of ones of said pulse width modulated reference voltages and pulse width modulated inverted reference voltages;
said distributor circuit means coupling selected ones of said pulse width modulated reference voltages and said pulse width modulated inverted reference voltages to selected ones of the control lines of the switches for generating said output voltages.

7. Apparatus as recited in claim 6 wherein said inverter has three outputs and said output voltages have a trapezoidal waveform and wherein:
said reference voltage generator means comprises voltage to frequency converter means having as an input a frequency dependent variable, resettable counter means coupled to said converter means, multiplying digital to analog converter means coupled to said counter means and having a multiplying input coupled to an amplitude control variable having an amplitude reference value and subtraction means having as inputs, said amplitude control variable and an output of said digital to analog converter means;

said pulse-width-modulator means comprises six comparator means, the sampling voltage being coupled to the input of three of said comparator means, an inverted sampling voltage being coupled to an input of the other three of said comparator means, said plurality of reference voltages comprising first, second and third reference voltages, the first, second and third reference voltages respectively coupled to the other inputs of said three of said comparator means whereby the pulse width modulated reference voltages are formed at outputs of said three comparator means, and the first, second and third reference voltages respectively coupled to the other input of the other three of said comparator means whereby the pulse width modulated inverted reference voltages are formed at outputs of said other three comparator means;

said distributor circuit means comprises ring counter means and a plurality of switching means, each switching means being coupled to said ring counter means and each having an input coupled to a respective one of said comparator means, said switching means sequentially coupling said pulse width modulated reference voltages and said pulse width modulated inverted reference voltages to the control lines of said switches of said pulse inverter.

* * * * *